United States Patent
Buchenroth, III et al.

(10) Patent No.: US 7,285,238 B2
(45) Date of Patent: Oct. 23, 2007

(54) REEF ARTIFACT

(75) Inventors: Felix R. Buchenroth, III, Daniel, WY (US); William D. Moore, Pittsboro, NC (US)

(73) Assignee: Reefmatters,LLC, Jackson, WY (US)

( * ) Notice: Subject to any disclaimer, the term of this patent is extended or adjusted under 35 U.S.C. 154(b) by 109 days.

(21) Appl. No.: 10/828,565

(22) Filed: Apr. 21, 2004

(65) Prior Publication Data
US 2005/0238431 A1    Oct. 27, 2005

(51) Int. Cl.
*B28B 1/14* (2006.01)
*B28B 7/16* (2006.01)
*B28B 7/20* (2006.01)
*B28B 7/30* (2006.01)
*B28B 7/06* (2006.01)

(52) U.S. Cl. .............. 264/313; 264/333; 264/220; 249/55; 249/127

(58) Field of Classification Search ............. 264/220, 264/222, 224, 225, 226, 227; 119/253, 255, 119/256
See application file for complete search history.

(56) References Cited

U.S. PATENT DOCUMENTS

| | | | | |
|---|---|---|---|---|
| 3,012,285 A | * | 12/1961 | Marcus et al. ............... | 264/76 |
| 3,095,605 A | * | 7/1963 | Finelt ......................... | 425/143 |
| 3,254,379 A | * | 6/1966 | Poe ............................ | 164/242 |
| 3,888,209 A | * | 6/1975 | Boots ......................... | 405/25 |
| 3,950,477 A | * | 4/1976 | Di Giacomo ............... | 264/226 |
| 4,045,933 A | | 9/1977 | Grillo | |
| 4,126,102 A | * | 11/1978 | Galloway ................... | 119/269 |
| 4,496,511 A | * | 1/1985 | Virgili ........................ | 264/225 |
| 5,215,406 A | * | 6/1993 | Hudson ...................... | 405/25 |
| 5,564,369 A | | 10/1996 | Barber et al. ............... | 119/221 |
| 5,836,265 A | | 11/1998 | Barber et al. ............... | 119/221 |

OTHER PUBLICATIONS

Eternal Reefs, http://www.eternalreefs.com, printed Apr. 21, 2004 (7 pages).
Four Season Maldive's Coral Restoration Project, http://www.artificialreefs.org/Photogallery/fourseasons/fourseasons0002.html, printed Apr. 21, 2004 (2 pages).
Reef Ball's Listbot Archive, http://www.artificialreefs.org/listbot/dec2001/305.htm, printed Apr. 21, 2004 (2 pages).
Artificial Reefs Repair Damaged Eco-Systems, http://www.caymennetnews.com/2005/06/855/sister/reefs.html, printed Jul. 15, 2005 (7 pages).
Durareef Website, www.durareef.com, printed Oct. 13, 2005 (22 pages).

* cited by examiner

*Primary Examiner*—Christina Johnson
*Assistant Examiner*—Matthew J. Daniels
(74) *Attorney, Agent, or Firm*—Workman Nydegger (57) ABSTRACT

A reef artifact for simulating a coral reef includes a reef-like formation, which forms a base structure for simulating coral. The reef-like formation also has structures on it that simulate reef organisms. The reef-organism structures enhance the varied and diverse coral-like surface of the reef-like formation. The reef artifact is also configured to be mounted on a sea wall or a sea floor. The reef artifact dampens the force of waves and water currents thereby reducing erosion of the sea wall. The reef artifact also provides a suitable marine environment for microorganisms and small marine animals, thereby creating a diverse marine habitat. In yet another use, the reef artifact is suited for use as a sculpture in a garden or on a patio.

24 Claims, 6 Drawing Sheets

REEF ARTIFACT

BACKGROUND OF THE INVENTION

1. The Field of the Invention

This invention relates to man-made aquatic structures. More specifically, this invention relates to a reef artifact designed to simulate a naturally occurring reef.

2. The Related Technology

A great deal of research has been done relating to the aquatic ecosystems surrounding oceanic reefs. Reef systems found in ocean waters are typically surrounded by ecosystems of plant life, microorganisms, and a rich abundance of aquatic life, including creatures that form a habitat on or around the various reef structures. The physical structure of a reef system included rock and/or the skeletal form of coral.

One major aquatic advantage of reefs is the varied surface and system of convoluted channels formed in the reef. This varied surface and convoluted system of channels diminishes strong ocean currents, yet allows water to flow in and around the reef. In addition, the varied surface and convoluted system of channels creates spaces where microorganisms and other small aquatic life can flourish. The microorganisms and small aquatic life create a food supply for surrounding wild life, thereby forming a diverse and rich ecosystem teaming with aquatic life.

People enjoy skin and scuba diving near coral reefs to experience the beauty of the aquatic landscape and to observe the varied species of aquatic life found on or surrounding the reef. Because the reef draws a variety of plant and animal life to it, the reef is a source of interest to sporting enthusiasts, such as fishermen, as well as providing material of interest to researchers and scientists.

In recent years, there has been a great loss of marine habitat that normally supports large numbers of marine species; specifically, there has been a loss of costal riparian zones, which have been filled to create human developments. These landfills are then frequently cut with waterways for boat passage. Typically, these channels or canals are composed of straight walls and flat bottoms.

Many marine creatures have evolved in and require the presence of certain marine habitats for their existence. Destroying the coastal riparian zones has had an adverse effect on many of these populations. Variable zones such as red bark mangrove and eroded fossilized reef are examples of some of the important types of habitats relied on by many aquatic organisms for their existence. Furthermore other organisms, which indirectly rely on the reef environment, have suffered.

Because of the ecological importance, advantages, and many uses of naturally occurring coral reefs, and because of the serious decline in vitality of vast areas of such reefs, man-made structures such as artificial reefs have been created. Common materials utilized in the creation of artificial reefs often include human refuse such as old rubber tires, scrape building materials, out of service rail and subway cars and sunken ships. Existing artificial reef systems are typically placed on the ocean floor. The composition and location of these artificial reefs may create some benefit, however they often cause undesired effects such as erosion and pollutants as the man-made materials break down.

Therefore, what is needed is a cost effective artificial reef that better simulates a real coral ecosystems and that can be placed in diverse locations.

BRIEF SUMMARY OF THE INVENTION

The present invention has been developed in response to the above and other needs in the art. Briefly summarized, exemplary embodiments of the present invention are directed to a reef artifact. The base structure of the reef artifact is a reef-like formation, which is a mass of material that is coral or is made to simulate coral. The reef-like formation also has simulated natural marine wildlife on it. The simulated coral and simulated marine wildlife provide a natural-like environment for microorganisms and small marine animals. In addition to enhancing aquatic life, the diverse marine wildlife supported by the simulated reef environment draws divers and scientists who wish to study and view these types of ecosystems.

Embodiments of the present invention also relates to a reef artifact mounted onto a structure such as a sea wall or sea floor to protect the sea wall or sea floor from the detrimental effects of water currents and waves crashing against it. In one respect, the reef artifacts act as a shock absorber or buffer by enabling the water to contact the reef artifact before contacting the wall. The reef artifact dampens the wave or current and redirects its energy to dissipate the wave or current. The shock absorption or buffering benefits the structure immediately behind the reef artifact, but it can also benefit other structures such as a wall that is opposite or down stream from the reef artifact. Because the reef artifact dampens or dissipates waves and currents incident on the wall, the reef artifact reduces the possibility of a wave or current rebounding off the wall. Consequently, the reef artifact can reduce wave or current erosion on walls opposite or downstream from the reef artifact.

The present invention also includes a method of making the reef artifact. In an exemplary embodiment, the reef artifact is made by first shaping a life-like reef formation using real or life-like materials, such as travertine stone. A plurality of reef organism forms are placed on the life-like reef formation to make a reef artifact that can be used as a form for making a mold. In a subsequent step a rubber mold is made of the reef artifact form. The mold can then be used to make any number of replicas of the reef artifact by pouring a moldable material in the mold and letting it harden or causing it to harden.

The artificial reef of the present invention may also be formed in a highly fashionable design so that it may act as a sculpture or design that can be used in a park, lawn, or other area in which it can be used as a decoration.

The present invention can significantly benefit oceanic waters near man-made structures. The reef artifact of the present invention advantageously reverses the ill effects created when structures such as wharfs, docks, and building are built on waterfront property, thereby refurbishing impacted habitat. The reef artifact helps return the structure and its living surroundings to a more natural ecosystem. In so doing, the reef artifact benefits the manmade structure as well as the marine environment.

Alternatively, the reef artifact can be used to enhance the visual or ecological characteristics of a naturally sterile marine environment. The reef artifact can be used to specifically target the recruitment of juvenile reef fish that will then have an opportunity to migrate to the outer reef once they mature.

These and other features of the present invention will become more fully apparent from the following description and appended claims.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

Figure 1:
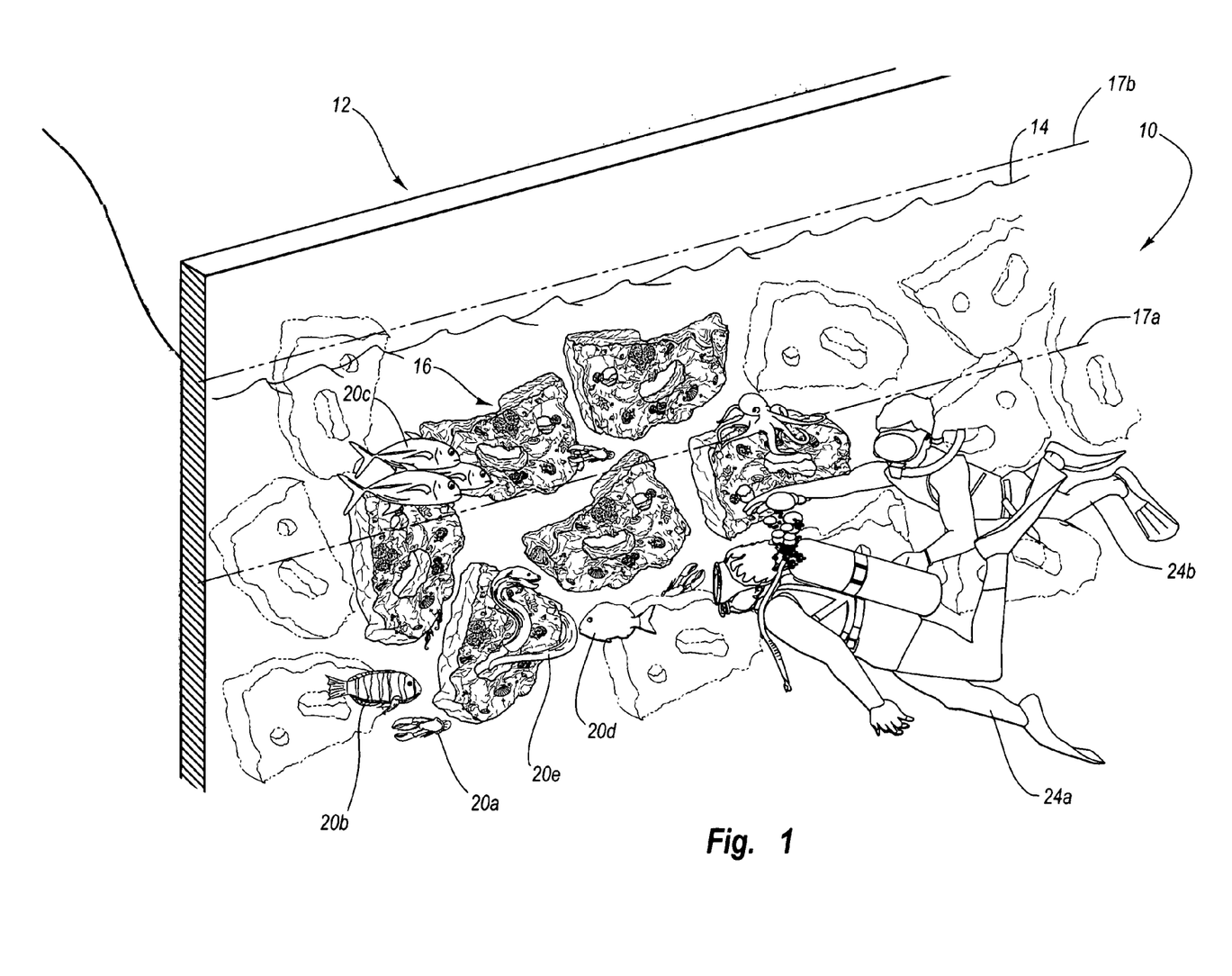
FIG. 1 is a perspective view of a reef assembly of the present invention with various reef artifacts coupled to a sea wall.

FIG. 1 demonstrates an example of a reef assembly 10 of the present invention. Reef assembly 10 includes a structure such as sea wall 12, which is partially submerged below a water surface 14 as illustrated by the waves hitting the sea wall 12. Alternatively, the structure of reef assembly 10 can be a landmass, dock, canal wall, or the like, whether or not submerged in water.

A plurality of reef artifacts 16 are mounted on sea wall 12 to form reef assembly 10. The reef artifacts 16 can be mounted below the low tide mark 17a or alternatively reef artifacts 16 can be mounted in the inter-tidal zone between low tide mark 17a and high tide mark 17b. The height at which reef artifacts 16 are placed determines in part what type of marine life will inhabit the reef artifacts.

Reef artifacts 16 provide a habitat for marine life and thus attracts various species of marine life 22a-22e. FIG. 1 also illustrates scuba diver 24a and skin diver 24b diving in the waters near reef assembly 10 and observing reef artifacts 16 and the marine life 22a-22e drawn thereto.

The reef assembly 10 can have a variety of different purposes. Reef artifact 16 can (i) act as a shock absorber, thereby decreasing the shock created by water contacting sea wall 12, (ii) act as an attractant for fish and other marine life, thereby forming an ecosystem which may be of interest to divers, researchers, and scientists, or (iii) be placed in a garden, yard, park or the like as a sculpture type decoration.

Figure 2:
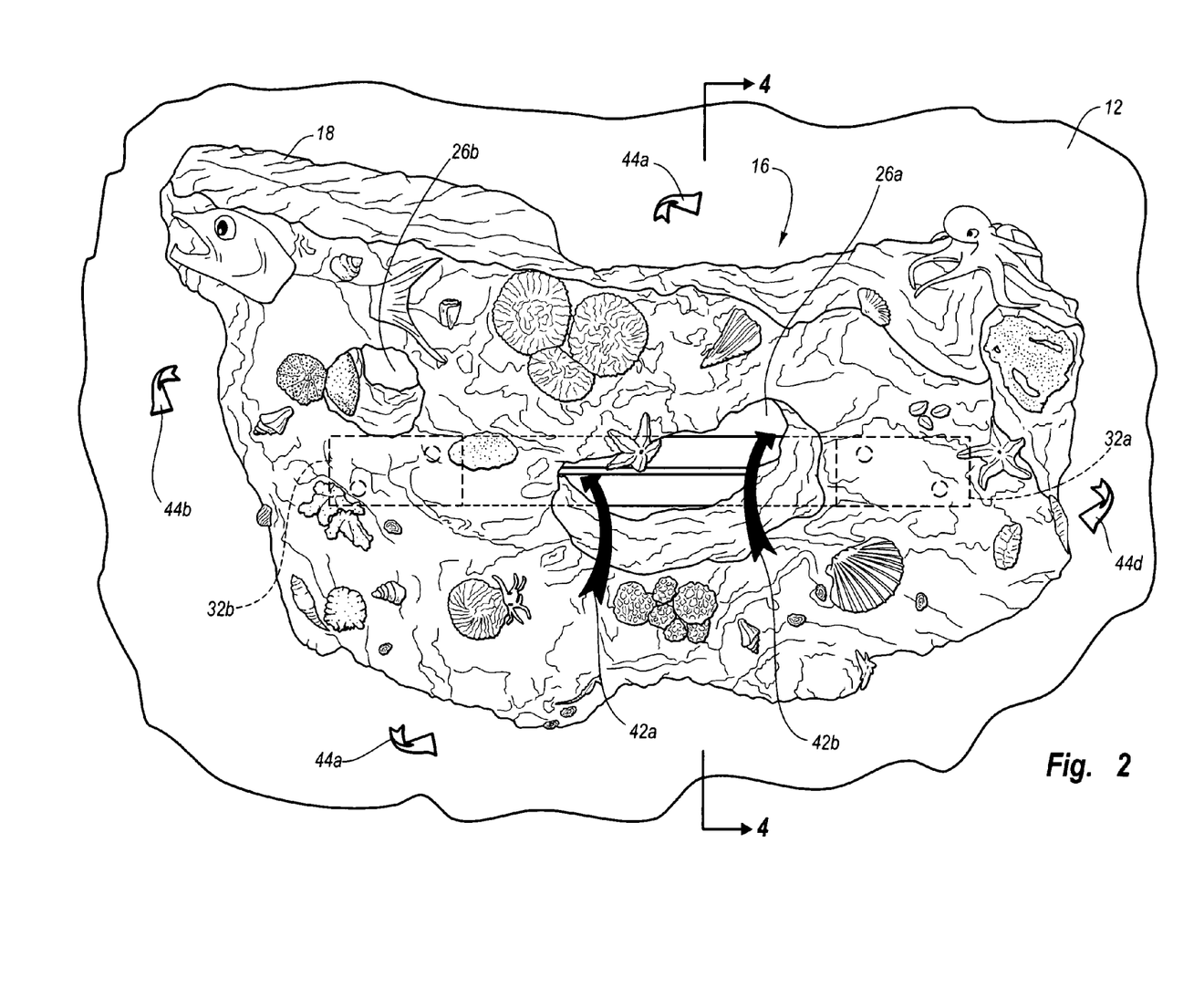
FIG. 2 is an elevational view of a reef artifact of the present invention.

Reef artifact 16 is shown in additional detail in FIG. 2. Reef artifact 16 includes a reef-like formation 18 with life-like structures mounted on it. Reef-like formation 18 is a structure that has the appearance of coral and provides the base structure of reef artifact 16. In an exemplary embodiment, reef-like formation 18 is generally rectangular and is about five feet wide by three feet high and eight inches deep in size. Of course reef-like formation 18, and thus reef artifact 16, can be any desired size or shape so long as reef artifact 18 can be properly placed in its desired location.

Reef-like formation 18 is formed to simulate the contours of a coral reef. The surface is irregular with various cavities or indentions. Reef-like formation 18 has apertures 26a and 26b where water can flow through reef artifact 16. Reef-like formation 18 may have any number or size of apertures, so long as they do not compromise the stability of reef artifact 16. Reef artifact 16 also has numerous reef-organism structures 20 formed on it. The reef-organism structures have the appearance of marine life such as a fish, a shell, a crab, an octopus, a sea horse, a plant, a starfish and/or other different life-like organisms. The life-like structures enhance the overall appearance and environment creating effect of reef-like formation 18.

The reef-organism structures are selected according to the particular reef environment that is desired. Different parts of the oceans around the world have vastly different marine life. The reef-organism structures can be selected to simulate the local marine environment or a particular marine environment found elsewhere in the world, or any combination of marine life.

In an exemplary embodiment, reef artifact 16 is made from a moldable material capable of forming a sturdy structure. The moldable material is a material that can be poured into a mold and then hardened, such as concrete. The type of concrete used can depend on the desired use. For instance, a reef artifact that is used as a decoration can be made of a relatively lightweight material. A reef artifact that needs to withstand strong ocean currents or waves can be made out of a hardened concrete. A reef artifact that provides habitat for microorganisms can be made out of a material that is conducive to living organisms. Examples of materials useful for creating the reef artifacts of the present invention include concrete, including concrete with various different sizes of aggregate and sand, cementitious materials, including calcium carbonate based cements, concrete with synthetic fibers such as nylon, resins, metals, clays, plastics and the like. Additionally, dyes can be added to the concrete to provide a desired look. Those skilled in the art will recognize that there are many suitable concretes and other materials that can be used to form the reef artifact of the present invention.

Figure 3:
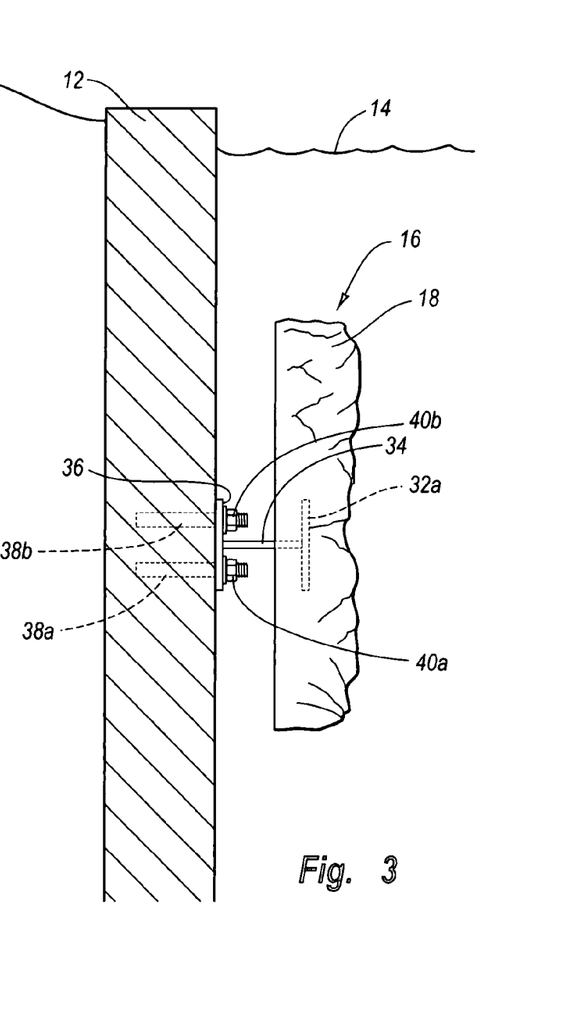
FIG. 3 is a side elevational view illustrating the reef artifact of FIG. 2 mounted on a sea wall.

Referring now to FIGS. 2 and 3, a connector such as mounting bracket 36 is partially disposed within reef formation 18 and allows reef artifact 16 to be mounted on a see wall 12, for example. Mounting bracket 36 is shaped like an I-beam. The front plate of the I-beam is cut out in the middle to form mounting brackets 32a and 32b. Cutting out the center portion of the front plate allows water to flow more easily through aperture 26a.

In an alternative embodiment, a pair of L-shaped brackets are used to mount artifact 16 to sea wall 12. In yet another embodiment, the moldable material of reef-like formation 18 is shaped to form a mounting bracket.

Reef artifact 16 is mounted to the wall by securing rear plate of bracket 36 to sea wall 12 using bolts 38a and 38b and nuts 40a and 40b. While the invention has been illustrated as using nuts and bolts to attach reef artifact 16 to wall 12, those skilled in the art will recognize that there are numerous alternative ways to provide this functionality.

Figure 4:
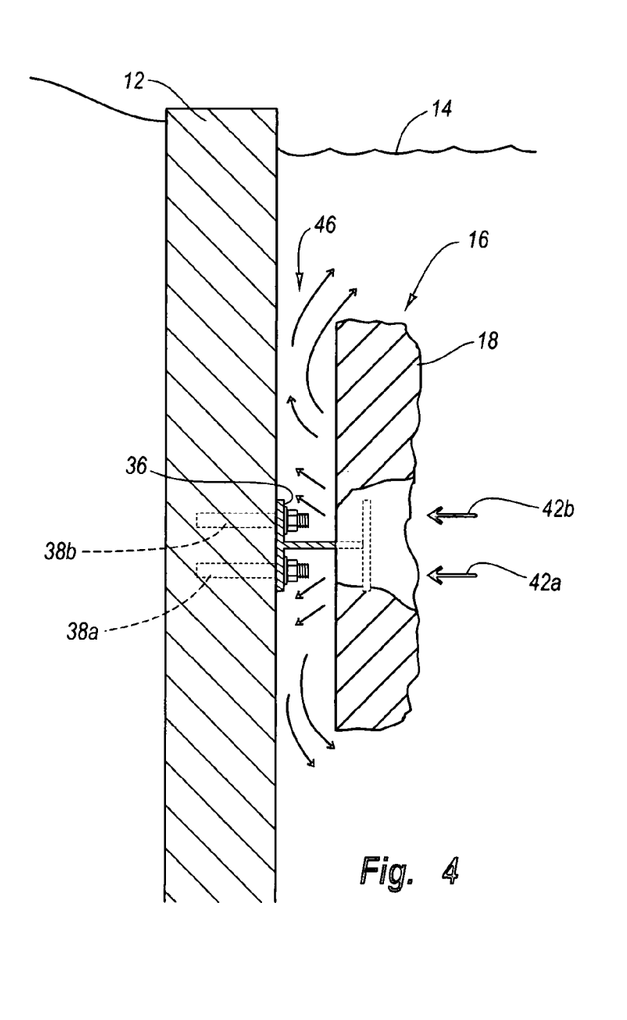
FIG. 4 is a cross-sectional view of FIG. 2, showing the flow of water around and through the reef artifact.

Referring now to FIGS. 2 and 4, reef artifact 16 is configured to control the flow of water around and through reef artifact 16, thereby disrupting the flow of water adjacent sea wall 12 and artifact 16. The exact flow of water around reef artifact 16 depends somewhat on the dynamics of the local environment and can change over time. Nevertheless, the shape, surface texture, and position of reef artifact 16 influences how water flows over reef artifact 16 and how water contacts sea wall 12. The arrows in FIGS. 2 and 4 represent one possibility for the flow of water around and through artifact 16. Arrows 42a and 42b represent water flow through aperture 26a, arrows 44a-44d (FIG. 2) represent water flow on the outside surface of reef artifact 16 and arrows 46 (FIG. 4) represent water flow between artifact 16 and wall 12. In another embodiment, the flow of water is opposite the flow illustrated in FIGS. 3 and 4 or is constantly changing.

Reef artifact 16 has a varied and diverse surface such that the surface creates drag and turbulence of the water flowing adjacent to reef artifact 16. The reef-organism structures enhance the drag by creating a larger and more varied surface. As currents and waves travel toward wall 12, reef artifact 16 breaks up the currents and waves by absorbing a portion of the energy in the wave or current. In addition to absorbing energy, reef artifact 16 also redirects waves and currents. Some of the energy in the wave or current is cancelled by the turbulence created from redirected waves and currents. Reef artifact 16 prevents erosion because a large portion of the energy of the wave or current is either diminished or directed away from wall 12. Apertures 26a and 26b enhance the shock absorbing capabilities of reef artifact 16 by channeling water therethrough and increasing the surface area of reef artifact 16. Thus, when the wave or current hits wall 12, the energy has been reduced and the wave or current has less potential for eroding wall 12.

Artifact 16 can also be mounted a selected distance from wall 12, such that water is able to flow between wall 12 and reef artifact 16. Energy from waves and currents is dissipated as it travels through this space. In some instances, waves striking a wall without artifact 16 will rebound off wall 12 and strike an opposing or downstream wall. By absorbing the initial shock of a wave or current, artifact 16 prevents or reduces erosion of the opposing or downstream wall caused by rebounding waves and currents.

The spacing between wall 12 and reef artifact 16 can be optimized for diminishing the energy in water flow 46. If the spacing is optimized, the flow behind reef artifact 16 causes proper flow and redirection of energy such that the energy in the waves cancels out. In one embodiment the space between wall 12 and reef artifact 16 is about 8 inches.

Another feature of the diverse and varied surface area on reef artifact 16 is that it provides a habitat for microorganisms and small marine animals such as small fish and lobsters. The microorganisms and other small marine life receive nutrients from the currents and waves flowing past reef artifact 16. The small reef-like contours of reef artifact 16 provide a firm habitat and shelter for microorganisms. Also, apertures 26a and 26b and the space between reef artifact 16 and wall 12 provide protection for small marine animals. The space behind reef artifact 16, the number and size of apertures, and the thickness of reef artifact 16 can be selected to attract specific types of marine life.

While artifact 16 has been shown with a flat back surface (i.e. the side facing the seawall), in another embodiment, the backside of the reef artifact has a contoured surface. In this embodiment, the contoured surface can be a mirror image of the front surface or shaped completely different. The back surface can also have life-like structures arranged thereon to create a desired effect or look.

Figure 5:
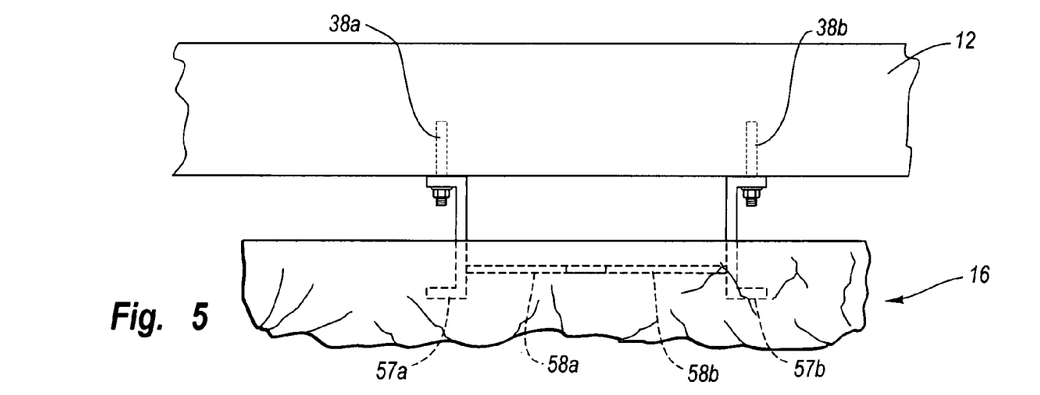
FIG. 5 is top view of an exemplary embodiment of a reef artifact of the present invention that includes a U-shaped type mounting bracket.
Figure 6:
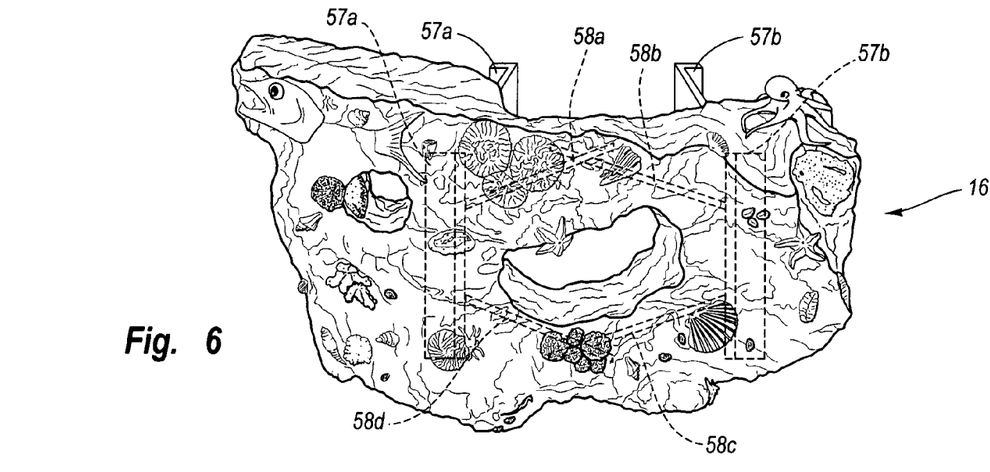
FIG. 6 is a front view of the reef artifact of FIG. 5 illustrating the position of the U-shaped mounting brackets.

FIG. 5 illustrates an alternative embodiment of reef artifact 16 that uses a U-shaped bracket for mounting reef artifact 16 on a sea wall or other structure. As shown in FIG. 6, U-brackets 57a and 57b are embedded in the material of reef artifact 16. Bolts 38a and 38b are used to mount U-brackets 57a and 57b to sea wall 12. U-brackets 57a and 57b are made of a thick metal or sturdy material that is capable of withstanding the forces created by holding reef artifact 16, which can weigh hundreds of pounds. U-brackets 57a and 57b and bolts 38a and 38b can be made from a corrosion resistant material such as galvanized steel or other synthetic or coated materials.

FIG. 6 is an exemplary embodiment showing pieces of rebar 58a-58d spanning reef artifact 16 to give it structural support. Pieces of rebar 58a-58b can be tied together and to U-brackets 57a and 57b using zip ties. The zip ties hold the pieces of rebar 58a-58b in place during the molding process. Once reef artifact 16 is formed, pieces of rebar 58a-58d are firmly in place and provide structural support to reef artifact 16.

Rebar can be placed anywhere in reef artifact 16 to provide additional support. The support needed often depends on the shape of reef artifact 16 and the materials used. By reinforcing reef artifact with rebar, reef artifact 16 can be made thinner and lighter without compromising its beneficial characteristics such as a shock absorber.

Figure 7:
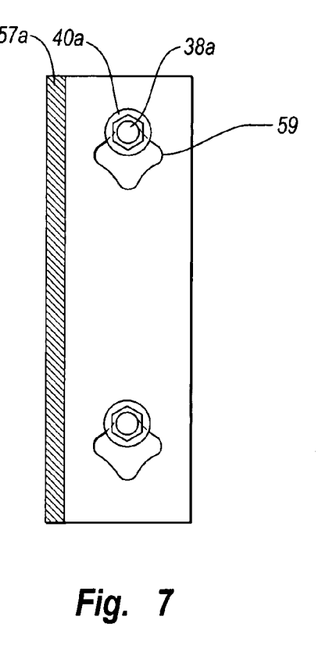
FIG. 7 is a cross sectional view of the U-bracket of FIG. 5 showing an exemplary mounting configuration.

FIG. 7 illustrates an exemplary mounting bracket design to facilitate placement of the reef artifact on a sea wall or other structure. U-bracket 57a has a diamond shaped cutout 59 where bolt 38a is passed through the U-bracket. The weight of reef artifact 16 causes the bolt to slide into the uppermost apex of cutout 59. A washer is placed over bold 38a and nut 40a is used to secure reef artifact 16.

The diamond shape cutout 59 allows reef artifact 16 to be rotated 90 degrees and mounted to the see wall without changing U-brackets 57a and 57b. In an alternative embodiment, cutout 59 could be a different shape to provide a greater selection of angles of rotation for mounting reef artifact 16. In addition, the cutout can be made at different angles as between different reef artifacts so as to cause the reef artifacts to be mounted at slightly different angles.

U-bracket 57 can contain any number of cutouts as needed to mount reef artifact 16. Furthermore, the cutout bolting system can be used with other types of brackets such as an L-bracket or I-beam.

The present invention also includes other types of connectors or mounting systems. For instance, a free standing reef artifact according to the present invention can be made by boring one or more holes in the bottom of the reef artifact and setting the reef artifact on a stand that has dowel(s) that extend into the one or more bores. Those skilled in the art will recognize that there are different types of mounting mechanism that are suitable for mounting the reef artifact of the present invention in various locations such as a sea wall, a sea floor, a garden, a patio or reception area, and the like.

Embodiments of the present invention also include methods for making reef artifact 16. Reef artifact 16 can be shaped or formed from various materials including real or life-like materials or man-made materials. In an exemplary embodiment, reef artifact 16 is made from a reef artifact mold. The reef artifact mold is made by first creating a reef artifact form and then pouring a rubber mold of the reef artifact form. The mold can then be used to make any number of replicas of the reef artifact.

Figure 8:
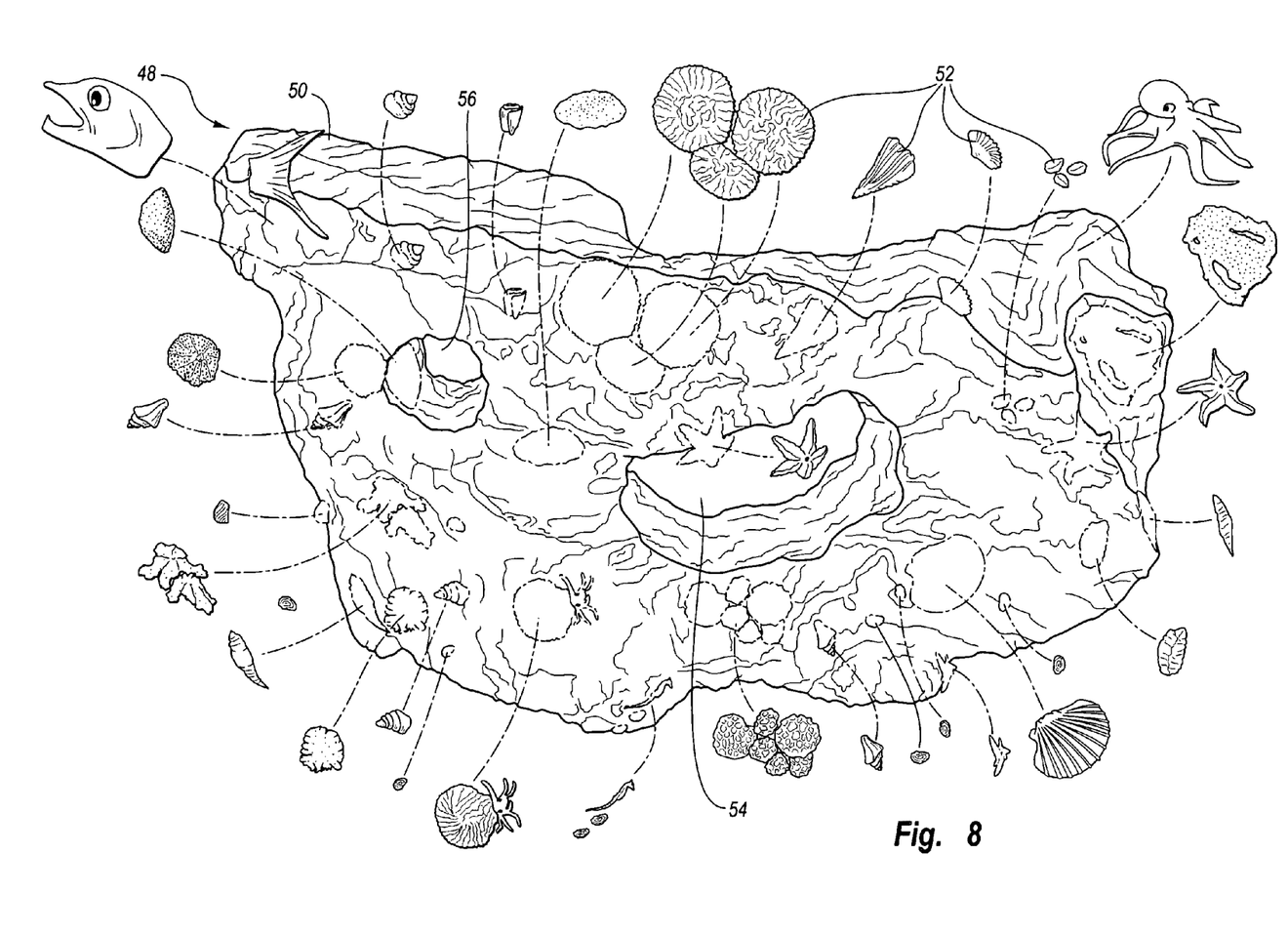
FIG. 8 is a perspective exploded view of a reef-like formation showing schematically the placement of reef-organism structures.

FIG. 8 shows an exploded view of a reef artifact form 48. Reef artifact form 48 is made from a reef-like formation 50 and a plurality of reef-organism structures 52. Any number of reef-organism structures can be adhered to reef-like formation 50 to make reef artifact form 48.

Figure 9:
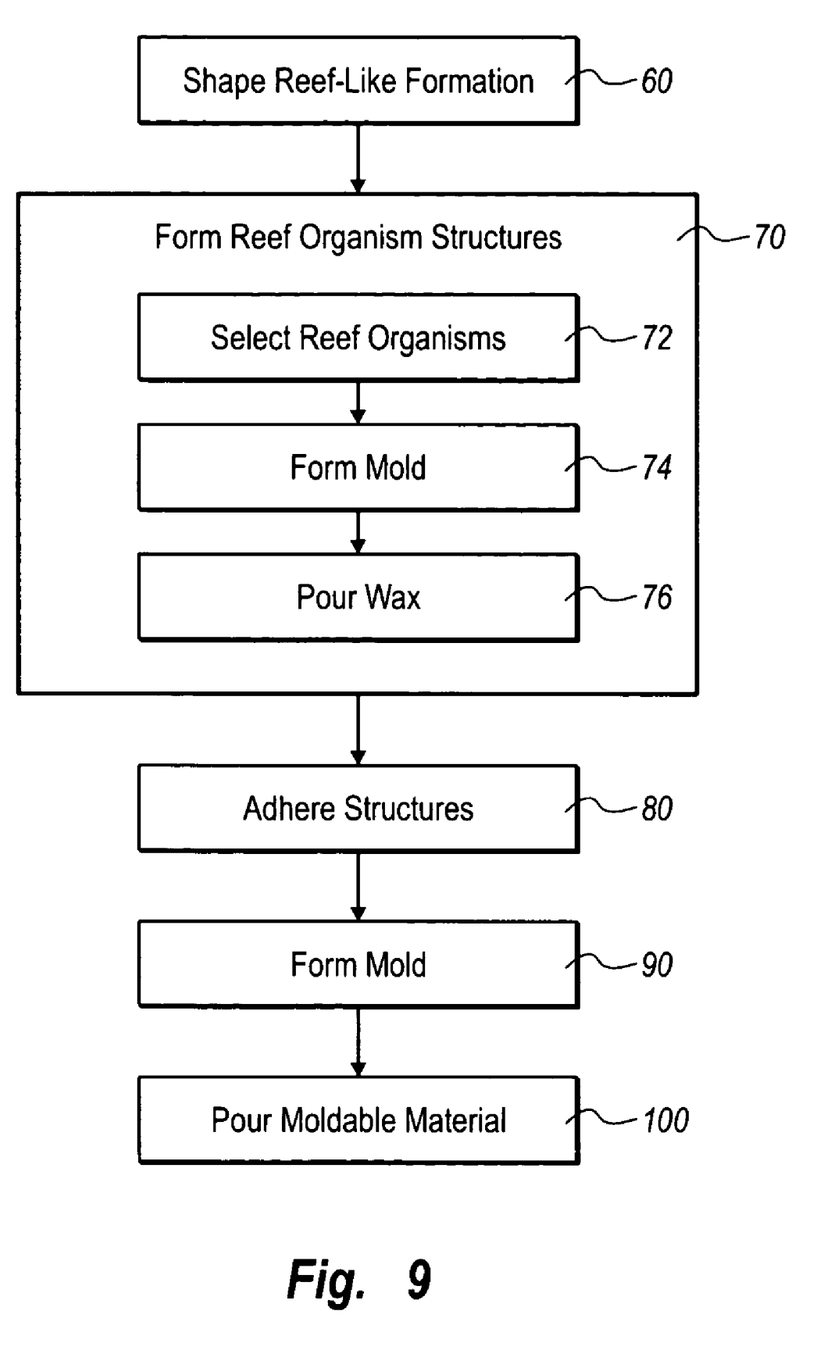
FIG. 9 is a block diagram showing the steps for making the reef artifact of FIG. 2 using a reef artifact mold.

FIG. 9 is a diagram of an exemplary method for making reef artifacts using a reef artifact mold. In step 60, a reef-like formation is provided or shaped by cutting travertine stone. The travertine stone can be cut to any desired shape and size. Apertures 54 and 56 are also cut into the travertine stone to shape the reef-like formation (FIG. 5). The travertine stone is used in an unfinished condition such that the porous, varied, and diverse surface is retained. Providing the reef-like formation includes selecting or cutting a natural or man-made stone or other material. Travertine stone provides a good reef-like material because travertine stone is actually petrified coral. However, other natural stones or man-made materials can be used.

In one embodiment, the reef-like formation is cut or selected such that two complementary, although different, reef artifacts can be formed from a single travertine stone. In this embodiment, the reef artifact mold, discussed more fully below, can be cut to form two molds that produce complementary reef artifacts. In one embodiment, the complementary reef artifacts can interlock to a certain degree such that when they are placed on a sea wall the can better form a mosaic. The complementary reef artifacts also provides a more economical way of providing a diverse surface area for attracting different types of marine life.

In another embodiment, complementary reef artifacts are connected or set together to form a reef artifact more suitable for viewing from all sides. Because the complementary reef artifacts are made from a single stone, the two pieces can be aligned easily and look natural. This embodiment is particularly useful for locations where all sides of the reef artifact will be viewed such as a free standing artifact in a garden or a sea floor.

In step 70, the reef-organism structures are provided. In step 72, dehydrated reef organisms are selected. Example reef organisms include seahorses, urchins, crabs, squid, starfish, shells, and the like. In step 74, a negative rubber mold is made from the dehydrated reef organisms. The rubber is allowed to fill the intricately detailed exterior surfaces of the marine animals. The negative rubber molds are removed from the marine animals and the molds retain the intricacies of the real animal. In step 76, a molten wax is poured in the mold and allowed to harden to form the reef-organism structures. The wax form, like the rubber mold, shows all the fine details of the marine animal. Of course those skilled in the art will recognize that materials other than rubber and wax can be used to make the molds and forms.

In step 80, the reef-organism structures are adhered to the reef-like formation to form reef artifact form 48, as shown in FIG. 5. A thin layer of wax on the back of the reef-organism structures 52 is melted. The reef-organism structures 52 are then placed on the reef-like formation 50 before the wax hardens. The reef-organism structures 52 are then placed on the surface of reef-like formation 50, including the inside surface of apertures 54 and 56 to direct the flow of water. In an exemplary embodiment, a super adhesive layer of wax is placed on the bottom layer of the reef-organism structures to assure that the reef-organism structures do not come off the travertine, especially when the travertine and adhered reef organisms structures are used to make a reef artifact mold as discussed below.

The reef artifact form 48 is then used to make a reef artifact mold. In step 90, a rubber material is poured on the reef artifact form 48 and the rubber is allowed to fill the intricate surface details and then solidify. Once the rubber is solid, the mold is removed from the reef artifact form 48. In one embodiment, each side of the reef artifact form 48 is used to make a mold in two halves.

The mold can be used repeatedly to make replicas of reef artifact form 48. By making a mold of reef artifact form 48, reef artifact 16 (FIG. 2) can be made using many different materials, which may have additional advantages such as reduced cost, better durability, or more aesthetically pleasing. Again, the mold can be made from a material other than rubber.

In step 100, reef artifacts are formed by pouring a moldable material into the reef artifact mold. As discussed above, in an exemplary embodiment, the moldable material is a material that can be poured into a mold and then hardened, such as concrete. The type of concrete used can depend on the desired use. For instance, a reef artifact that is used as a decoration can be made of a relatively lightweight material. A reef artifact that needs to withstand strong ocean currents or waves can be made out of a hardened concrete. A reef artifact that provides habitat for microorganisms can be made out of a material that is conducive to living organisms. Examples of materials useful for creating the reef artifact of the present invention include concrete, metals, clay, plastics, resins, and other known cementitious compositions. The reef artifact can be made of concrete with various different sizes of aggregate and sand, and/or concrete with synthetic fibers such as nylon. Additionally, dyes can be added to the concrete to provide a desired look.

The mounting bracket discussed above is added to the moldable material before it hardens. If the mounting bracket is an I-beam, then the I-beam is partially inserted into the moldable material before the moldable material hardens. If the mounting bracket is to be formed out of the moldable material, a mounting bracket form can be inserted into the moldable material before it hardens. Alternatively, the form of the mounting bracket can be part of the mold, in which case, a mounting bracket form is placed in the rubber during step 90 before the rubber solidifies.

As discussed above, one use for artifact 16 is to mount it on a sea wall to act as a shock absorber or buffer. Another use for reef artifact 16 is to create a marine life environment near a sea wall or sea floor. Mounting reef artifact 16 on a sea wall or placing reef artifact 16 on a see floor requires selecting a proper location where the benefits of reef artifact 16 are advantageous. For instance, the buffering effect may be important near docks, wharfs or shoreline buildings. Attracting marine life can be more important in another location such as a sea floor. The type of material to which reef artifact 16 is mounted varies from structure to structure and affects how reef artifact 16 is mounted. The size and shape of reef artifact 16 also dictates what type of mounting mechanism is required. In addition, reef artifact may be mounted by placing it on a pedestal, or alternatively, the reef artifact of the present invention can be placed as a stand alone on a sea floor or other support.

Referring again to FIG. 1, in one embodiment, a plurality of reef artifacts 16 are mounted to a sea wall 12. The number of reef artifacts mounted on the wall is selected to cover a desired amount of surface area. The covered surface area can be continuous or broken up into pockets of reef artifacts to create individual microcosms of marine life. Replicas of the same reef artifact 16 can be rotated and mounted at different angles to give the appearance that individual reef artifacts are unique. In one embodiment, continuous reef artifacts 16 are spaced about a foot apart and are mounted at a depth of about 2 feet to 10 feet below water surface 14. The reef artifacts 16 can also be placed in the inter-tidal zone between tides 17a and 17b, below the low tide 17a, or above the high tide 17b. For purposes of this disclosure, a water surface level is measured according to high tide.

Referring again to FIG. 3, in one embodiment, reef artifact 16 is mounted to wall 12 by first boring holes in sea wall 12 that correspond to the number of bolts needed to mount reef artifact 16. An expandable bolt 38 is placed in each hole and then epoxied with a waterproof marine epoxy. The reef artifact 16 is mounted to the bolt 38 and fastened with a nut.

Reef artifact 16 can also be used as a decoration such as for patio art. Reef artifact 16 has astounding details of marine life and coral, thus making it interesting from an artistic perspective. In addition, reef artifact 16 can be made out of materials that are well suited for outdoor or indoor use. By selecting the proper moldable material, reef artifact 16 can be designed to be placed in different environments while still providing a very detailed sculpture.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A method for making a reef artifact mold comprising:
   providing a reef-like formation having a varied surface;
   providing at least one reef-organism structure;
   adhering the at least one reef-organism structure to the reef-like formation to produce a reef artifact form wherein the reef organism structure is a molded reef organism structure that simulates a naturally occurring reef organism structure; and
   making a reef artifact mold using said reef artifact form, wherein providing at least one reef-organism structure comprises forming at least one reef-organism structure, and wherein forming at least one reef-organism structure comprises:
   selecting at least one dehydrated reef organism, wherein the dehydrated reef organism comprises a dehydrated marine animal;
   forming a mold of the at least one dehydrated reef organism; and
   molding at least one reef-organism structure.

2. A method according to claim 1, wherein the at least one reef-organism structure simulates a naturally occurring reef organism.

3. A method according to claim 1, wherein the dehydrated reef organism is selected from the group consisting of a seahorse, urchin, crab, squid, starfish, octopus, and fish.

4. A method according to claim 1, wherein the dehydrated reef organism is selected from the group consisting of a seahorse, urchin, crab, squid, and starfish.

5. A method according to claim 1, wherein providing the reef-like formation comprises selecting or cutting travertine stone.

6. A method according to claim 1, further comprising adhering a plurality of reef-organism structures to the reef-like formation.

7. A method according to claim 6, wherein providing the plurality of reef-organism structures comprises:
   selecting a plurality of dehydrated reef organisms;
   forming a rubber negative mold of each of the plurality of dehydrated reef organisms; and
   pouring a wax into each of the rubber negative molds to form the plurality of reef-organism structures.

8. A method according to claim 7, wherein adhering the reef-organism structures to the reef-like formation comprises melting a surface layer of wax of each of the reef-organism structures and adhering each of the reef-organism structures to the reef-like formation before the melted wax hardens.

9. A method of making a reef artifact according to claim 1 further comprising, (i) pouring a moldable material into the reef artifact mold and (ii) allowing the moldable material to harden to form a reef article, and removing the reef artifact from the reef artifact mold.

10. A method of making a reef artifact assembly according to claim 6 further comprising, repeating steps (i) and (ii) to form a plurality of reef artifacts and mounting the plurality of reef artifacts on a structure.

11. A method according to claim 10, wherein mounting the plurality of reef artifacts on the structure further comprises:
   drilling a plurality of holes in the structure with a desired spacing for mounting the plurality of reef artifacts thereon;
   inserting a bolt into the hole and using a marine epoxy to permanently fix the bolt in the hole; and
   mounting the reef artifacts on the bolts.

12. A method according to claim 10, wherein each of the plurality of reef artifacts is mounted between about 2 and about 10 feet below a water surface.

13. A method according to claim 10, wherein step (i) further comprises partially inserting a mounting bracket into the moldable material.

14. A method according to claim 13, wherein each of the plurality of reef artifacts is mounted with a desired amount of space between the structure and the reef artifact such that small marine animals can fit therebetween.

15. A method as in claim 13, wherein the moldable material is concrete.

16. A method as in claim 15, wherein the concrete comprises calcium carbonate.

17. A method as in claim 1, further comprising pouring a concrete mixture into the mold, forming a reef artifact by allowing the concrete mixture to cure, and removing the mold to yield a reef artifact.

18. A method for manufacturing a reef artifact suitable for use in an aquatic environment, wherein the reef artifact is configured to be mounted on a structure that is at least partially submerged in water and receives a shock from water moving toward the structure, the reef artifact being configured to disrupt the flow of the water adjacent thereto such that the reef artifact absorbs at least a portion of the shock of the water moving toward the structure, the method of manufacturing the reef artifact comprising:
   providing a reef-like formation having a varied surface;
   forming at least one reef-organism structure, wherein forming at least one reef-organism structure comprises:
   selecting at least one real or simulated reef organism;
   forming a mold of each of the at least one real or simulated reef organism; and molding at least one reef-organism structure;

adhering the at least one reef-organism structure to the reef-like formation to produce a reef artifact form;

making a reef artifact mold using the reef artifact form;

pouring a moldable material into the mold;

partially inserting a mounting bracket into the moldable material, the mounting bracket configured to mount the reef artifact on a structure that is at least partially submerged in water and receives a shock from water moving toward the structure; and allowing the moldable material to harden.

19. A method as in claim 18, wherein forming the reef organism structures comprises forming a plurality of reef-organism structures from a plurality of negative molds.

20. A method as in claim 18, wherein the steps of pouring concrete and removing the mold is repeated a plurality of times to make a plurality of reef artifacts.

21. A method for manufacturing a reef artifact suitable for use in an aquatic environment, comprising:

providing a reef-like formation having a varied surface;

providing a plurality of molded reef-organism structures that simulate a real reef organism wherein providing a plurality of molded reef-organism structures that simulates a real reef organism comprises:

selecting a plurality of dehydrated reef organisms, each of the dehydrated reef organisms comprising a dehydrated marine animal;

forming a rubber negative mold of each of the plurality of dehydrated reef organisms;

pouring a wax into each of the rubber negative molds to form the plurality of reef-organism structures;

adhering the at least one reef-organism structure to the reef-like formation to produce a reef artifact form;

making a reef artifact mold using the reef artifact form; and pouring a concrete mixture into the mold and allowing the concrete mixture to harden.

22. A method for manufacturing and mounting a reef artifact suitable for use in an aquatic environment, wherein the reef artifact is configured to be mounted on a structure that is at least partially submerged in water and receives a shock from water moving toward the structure, the reef artifact being configured to disrupt the flow of the water adjacent thereto such that the reef artifact absorbs at least a portion of the shock of the water moving toward the structure, the method of manufacturing the reef artifact comprising:

providing a reef-like formation having a varied surface;

forming at least one reef-organism structure, wherein forming at least one reef-organism structure comprises:

selecting at least one real or simulated reef organism;

forming a mold of each of the at least one real or simulated reef organism;

and molding at least one reef-organism structure;

adhering the at least one reef-organism structure to the reef-like formation to produce a reef artifact form;

making a reef artifact mold using the reef artifact form;

pouring a moldable material into the mold;

partially inserting a mounting bracket into the moldable material, the mounting bracket configured to mount the reef artifact on a structure;

allowing the moldable material to harden, thereby forming a reef artifact suitable for mounting in an aquatic environment; and mounting the reef artifact on a structure that is at least partially submerged in water and receives a shock from water moving toward the structure, the reef artifact being configured to disrupt the flow of the water adjacent thereto such that the reef artifact absorbs at least a portion of the shock of the water moving toward the structure.

23. A method as recited in claim 22, wherein selecting at least one real or simulated reef organism comprises selecting a marine animal.

24. A method as recited in claim 18, wherein the reef artifact has a substantially flat back and the mounting bracket extends from the substantially flat back.

\* \* \* \* \*

UNITED STATES PATENT AND TRADEMARK OFFICE
CERTIFICATE OF CORRECTION

PATENT NO. : 7,285,238 B2  
APPLICATION NO. : 10/828565  
DATED : October 23, 2007  
INVENTOR(S) : Buchenroth, III et al.

It is certified that error appears in the above-identified patent and that said Letters Patent is hereby corrected as shown below:

Column 3  
Line 59, change "22a-22e" to --20a-20e--  
Line 62, change "22a-22e" to --20a-20e--

Column 4  
Line 20, remove "20"  
Line 56, change "see" to --sea--

Column 6  
Line 39, change "bold" to --bolt--

Column 8  
Line 50, change "see" to --sea--

Signed and Sealed this

Twenty-third Day of September, 2008

JON W. DUDAS  
*Director of the United States Patent and Trademark Office*